（12） United States Patent
Hudson (10) Patent No.: US 6,654,865 B2
(45) Date of Patent: Nov. 25, 2003

(54) NETBUFS: COMMUNICATION PROTOCOL PACKET BUFFERING USING PAGED MEMORY MANAGEMENT

(75) Inventor: David J. Hudson, Wheelock (GB)

(73) Assignee: Ubicom, Inc., Mountain View, CA (US)

( * ) Notice: Subject to any disclaimer, the term of this patent is extended or adjusted under 35 U.S.C. 154(b) by 0 days.

(21) Appl. No.: 10/061,548

(22) Filed: Jan. 31, 2002

(65) Prior Publication Data

US 2003/0145187 A1 Jul. 31, 2003

(51) Int. Cl.[7] .............................................. G06F 12/10
(52) U.S. Cl. ..................................................... 711/202
(58) Field of Search ................................ 711/117, 202, 711/147, 206, 203; 709/213; 710/52

(56) References Cited

U.S. PATENT DOCUMENTS

| | | | | |
|---|---|---|---|---|
| 5,276,829 A | * | 1/1994 | Sano ........................... | 711/210 |
| 5,517,633 A | * | 5/1996 | Ohta et al. .................. | 711/146 |
| 5,826,041 A | * | 10/1998 | Ogus ........................... | 709/234 |
| 5,867,664 A | * | 2/1999 | Kosugi et al. ................ | 710/56 |
| 5,978,894 A | * | 11/1999 | Sukegawa et al. .......... | 711/203 |
| 6,151,644 A | * | 11/2000 | Wu ............................... | 710/52 |
| 6,181,705 B1 | * | 1/2001 | Branstad et al. ............ | 370/412 |
| 6,378,058 B1 | * | 4/2002 | Furuhashi .................... | 711/203 |

* cited by examiner

Primary Examiner—Hiep T. Nguyen
(74) Attorney, Agent, or Firm—Fenwick & West LLP (57) ABSTRACT

A processor including a plurality of netpages to store packet data and a netbuf to index the plurality of netpages is disclosed.

1 Claim, 10 Drawing Sheets

NETBUFS: COMMUNICATION PROTOCOL PACKET BUFFERING USING PAGED MEMORY MANAGEMENT

FIELD OF THE INVENTION

This invention relates generally to the field of communications protocol implementation and specifically to the field of implementing communications protocols within microprocessor-based systems that have limited amounts of memory.

BACKGROUND OF THE INVENTION

Many microprocessor-based systems are designed with limited memory resources, however there is an increasing but, often, conflicting desire to implement one or more communications protocols within them. Frequently, the requirements of a conventional general-purpose implementation of the communications protocols and the constrained memory size mean that there is insufficient capacity to store and process data packets within these systems.

Even in situations where memory availability is not an issue, there is a general requirement that the mechanisms used to implement communications protocols should impose a minimal run-time overhead. An additional consideration is that there are many applications of such systems where two or more, possibly unrelated, protocols may need to be implemented concurrently. Under these circumstances a mechanism that meets the requirements of one protocol may prove to be a very poor solution for another. It is also noteworthy that in order to best exploit the resources available within a system it is often advantageous to be able to store data in more than one type of memory, for example a fast on-chip memory and a slower, larger, off-chip memory.

A number of possible strategies for managing communication buffers have been developed previously, however these are mostly targeted at systems with larger amounts of memory than many of those to which this invention might apply. Related developments however would include the following:

The Berkeley Unix system implemented a strategy known as mbufs, each of which contains a portion of the data within a communication packet. The mbufs are joined together via various forms of linked list, which are in turn iterated around by special helper software functions to provide an apparently contiguous view of the packet to their users. The design of the mbufs are not suited to the present problem however because they assume that any information about the individual mbufs may be stored within the mbufs themselves and thus the run-time cost of accessing individual elements within them is quite high. In addition the mbufs are stored within the main system memory, that is impractical in limited memory devices. Finally, while mbufs offer a clustering solution that allows the sharing of data between two or more chains of buffers, the sharing introduces another level of indirection and run-time cost.

Linux utilizes a system called skbuffs, each of which is a relatively large fixed size and which may be grouped together if necessary to form larger blocks. The larger size allows for efficient run-time operation, however the size of a single skfbuff may be greater than the memory available within some embedded systems to which the invention may be applied, and multiple skbuffs must be available in order to implement any useful form of communications. Skbuffs also suffer the same problems as mbufs with their requirement to use main system memory.

Many large systems provide hardware support for virtual memory management. This allows the system to present the appearance of having more memory than it in fact does. In this situation, however, the software concepts employed within such systems to facilitate the memory management cannot be used because the underlying hardware does not support the virtual memory management mechanisms. In addition, virtual memory is primarily implemented using the main system memory; something that we cannot assume is available for use.

Many network interconnection devices such as the National Semiconductor NS8390 provide pages within their internal buffer memories, into which data packets may be read or written. Such solutions, however, require specialized hardware to support their activities. It is also characteristic of such implementations that all of the pages within a packet must be contiguous. Within their specific field of operation the requirement for contiguous pages is not a problem, however within a microprocessor's software individual packets or portions of packets may be discarded without regard for the order in which they were created and thus such a simple solution is not suitable because it does not allow the memory to be managed effectively.

There are many other implementations of packet buffer memory management strategies in use, however these provide either subsets of the above, require large amounts of memory or use assumptions about the form of the data that will be processed (thus failing the requirement to be general purpose).

SUMMARY OF THE INVENTION

A communication protocol packet buffering system and method using paged memory management that provides a mechanism for a microprocessor-based system to manage communication (network) data packets. This buffering management strategy includes the individual network packet buffers (netbufs). Netbufs provide a general-purpose mechanism for managing communication packets and are not tied to any particular type of communication protocol. As such it is possible for the microprocessor-based system to use different netbufs for different purposes at the same time. For example, netbufs can be used in situations where one or more communications protocols are in use, such as in protocol converters or gateways. The netbufs allow a general-purpose implementation of a range of communication protocols within a microprocessor-based system that is conventionally deemed to have a memory capacity that is too small. Customers are thus able to implement applications in situations that would either have been previously impractical for reasons of cost or physical integration, or alternatively with lower-cost hardware.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
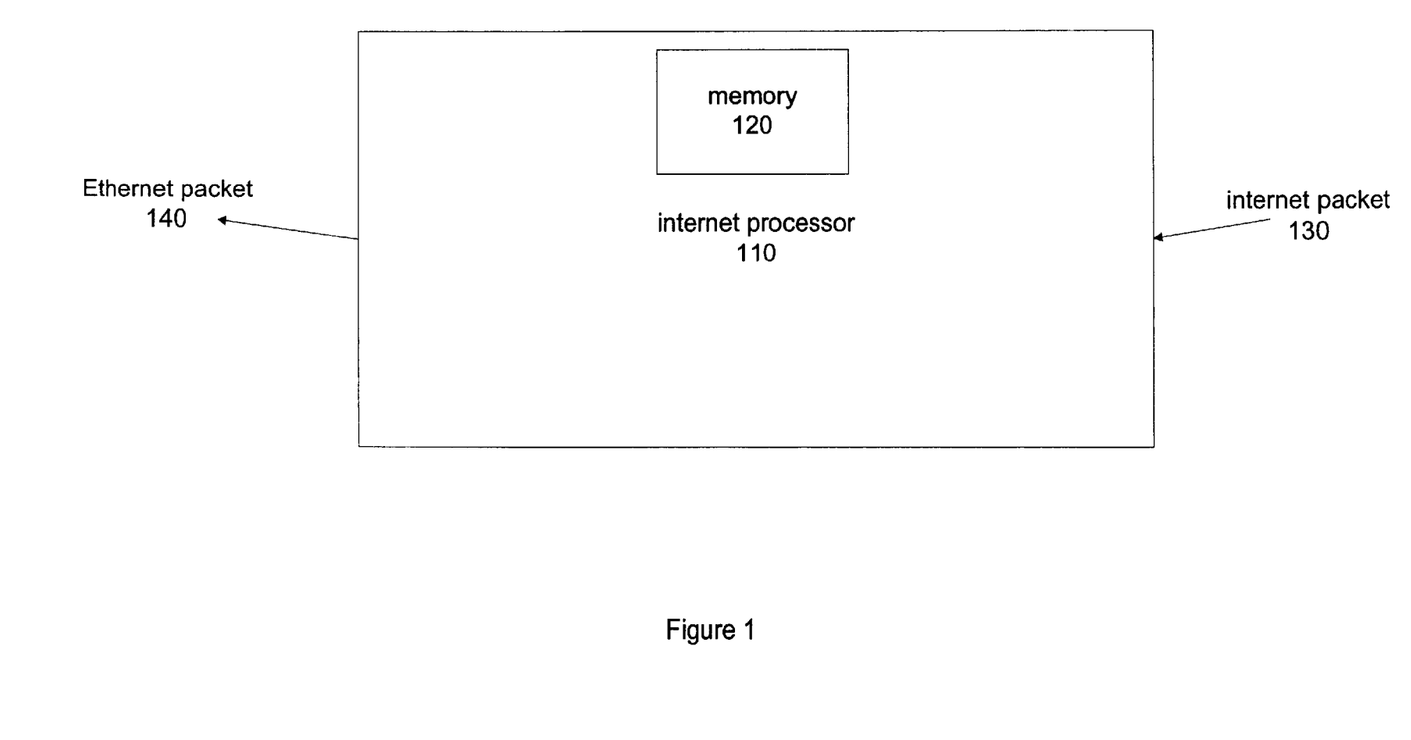
FIG. 1 shows an embodiment of a microprocessor-based system, such as an internet processor for example, that uses netbufs according to one embodiment of the present invention.

Applications such as communications software used by microprocessor based system 110 to implement network protocols and protocol conversion are loaded into the on-chip microprocessor memory 120, which may be program memory (PRAM), as shown in FIG. 1. These applications are used to process data for receiving and transmitting data packets, where the processing occurs on the chip itself. A packet 130 that is received by the system 110 from a network, such as the internet for example, may need to be converted into another packet 140 and sent by the chip to another network, such as an Ethernet for example. Netbuf management software is executed by the microprocessor based system 110 and is used to store the received packet in netpages, which may be in PRAM for example. The netbuf management software is also used to access and process the packet data stored in the netpages using a corresponding netbuf, which may be stored in SRAM for example.

Within a netbuf, communication packet data may be stored and modified using smaller fixed-size pages of memory, known as netpages, which may be either located within the main system memory or in some secondary memory space. Netbuf management software manages the interaction between the packet data stored in the netpages, and any application that uses or manipulates the packet data. Each netbuf is associated with a list of the netpages for which it is responsible.

Figure 2:
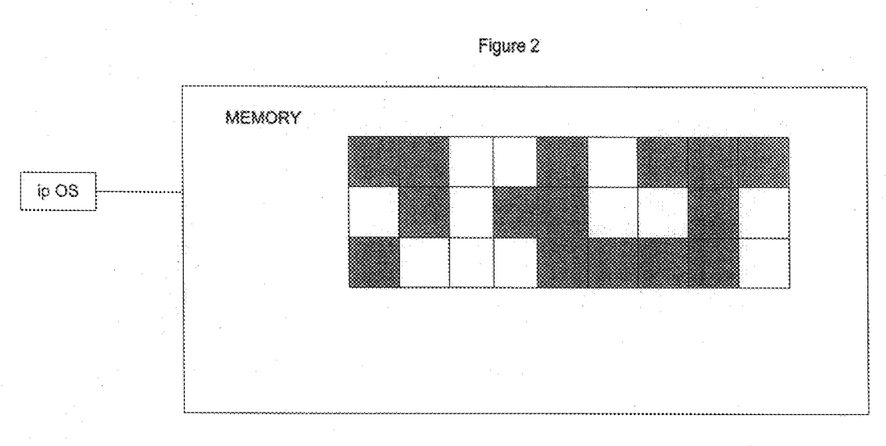
FIG. 2 shows an embodiment of a memory in a processor that can store netpages according to one embodiment of the present invention.
Figure 3:
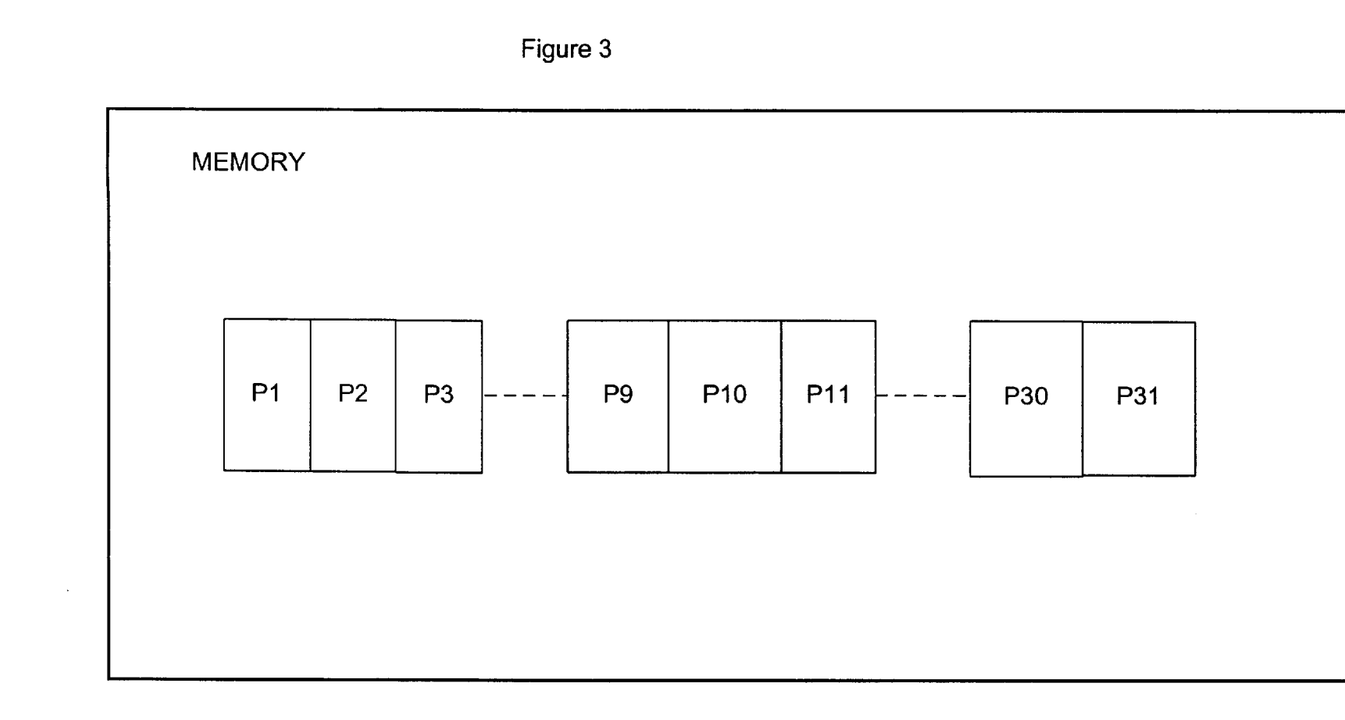
FIG. 3 shows a memory in a processor that can store netpages according to one embodiment of the present invention.

The netpages may utilize portions of memory not normally intended for data storage such as any PRAM that remain unused by other applications. In such cases the total number of netpages depends upon the size of any other software that is sharing the same memory. The operating system identifies any unused memory at startup, and allocates this memory to be used for netpages, as shown in FIG. 2. This unused memory may be in either contiguous or noncontiguous blocks. A netpage identifier is associated with each free memory block so that the free memory blocks appear as logically sequential netpages as shown in FIG. 3.

The netpages may be a fixed size to allow any netpage, without preference, to be used when a new one is required. For example, each netpage may be 256 bytes in size and each netbuf may manage the data in 8 netpages (thus a 2 kByte total size). The netbuf management software presents a logical view of a byte-addressable storage mechanism even when the underlying netpages may require some alternative addressing format. For example, in the processor already discussed, the PRAM can only be accessed in a word-addressable form, yet the netbuf data appears to be byte-addressed.

Figure 4:
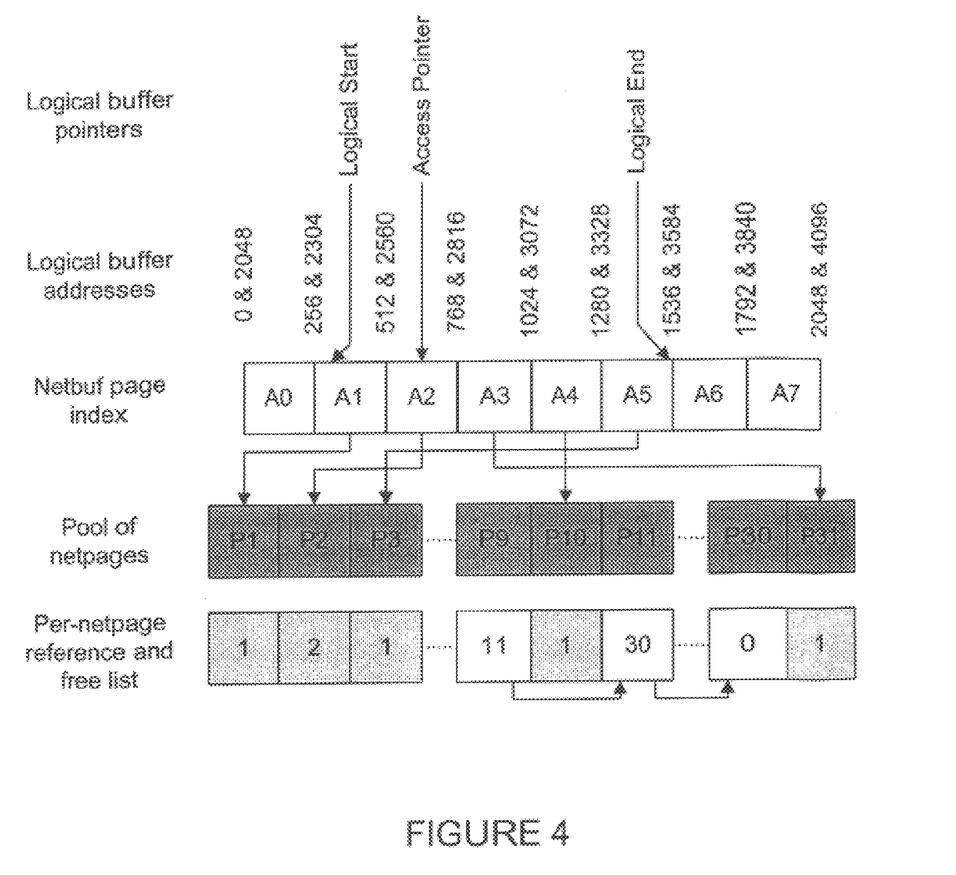
FIG. 4 shows a netbuf according to one embodiment of the present invention.

When a packet is received, the netbuf management software stores the packet in netpages 410, as shown in FIG. 4. A netbuf 420 is associated with the netpages that store the packet data. The netbuf 420 may be resident in the same memory as the netpages, or may be located in different types of on-chip or off-chip data memory. The netbuf contains a netpage index to allow physical netpage addresses to be mapped into the logical address space of the netbuf 420. The netpage identifiers indexed (referenced) by the netbuf are each associated with the physical address of the corresponding netpage that holds the actual buffered data. For example, netbuf 420 may use a single byte associated with index entry A0 to identify netpage P1, from which a physical address may be deterrmined. The netbuf can therefore hide the physical addresses of the individual fixed-size netpages from the applications that process the packet data. The data in the netpages can be accessed via the logical netbuf addresses using the netbuf management software.

This data-hiding allows the true location of the netpages to remain hidden so that different pages may be stored in different types of memory and may use a number of different types of access mechanisms. Additionally, the ability for the buffering strategy to hide the specific details of where and how data is stored means that any spare memory resources can be utilized with no inconvenience to a programmer who is developing software that uses it. This strategy allows development and maintenance costs associated with systems utilizing the invention to be kept lower than a situation where such issues require explicit attention from the programmer.

The fixed size of the netpages makes the overhead associated with allocation very low as it may be handled with a simple free-list. Netpages may be either allocated or free. If they are allocated then they are in use by one or more netpages, whereas if they are free then no netbufs reference them. Associated with the physical netpages is a table containing reference count information or pointers to the list of unused, or free, netpages. When a page is in use the reference count identifies how many netbufs index that specific netpage. When the page is not in use, the table entry contains a pointer to the next unused page, if any, to form a list of unused netpages.

For example, the netbuf application includes free list pointers that identify free netpages as shown in FIG. 4. A received packet is stored in free netpages obtained by using the free list pointer. A free netpage entry in the list may have a pointer to another free netpage. For example, if netpage P9 is the first free page in the free list, a portion of the received packet will be stored in netpage P9. The free list pointer for netpage P9 points to the next free page in the list, such as netpage P11 for example, which is then used to store the next portion of the packet. If a netpage is the last available free netpage, the free list pointer does not point to another netpage. For example, netpage P30 is the last available netpage, so the corresponding pointer points to 0.

When the status of a netpage changes from free to used, the corresponding entry on the free list pointer changes. Instead of pointing to the next free page, the entry is changed to a reference count that identifies the number of netbufs that reference the netpage. For example, netpages P1, P3, P10, and P31 are each referenced by one netbuf. Netpage P2 is referenced by two netbufs. As netpages can be either allocated or free but not both at the same time, the free-list pointer and the reference count for a given netpage may occupy the same memory locations.

When data is to be written to a netbuf, the reference count is checked for the netpage that will be modified. If the reference count is one then the write may occur immediately. A value greater than one indicates that a copy-on-write operation is required. For example, if a netbuf that contains one or more shared pages needs to be modified the netbuf application will identify the potential conflict and will create new duplicate netpages for those that need to be written to (each newly copied page is not used by the other netbufs so its owner is free to modify it) it is important to note that each netbuf does not have to manage contiguously numbered or addressed netpages, otherwise the copy-on-write solution would not work.

While it may not be immediately obvious where such sharing of data is likely to occur, in practice it happens frequently. Many communications protocols implement "echo" or "loopback" mechanisms where received data is copied back to the sender and where often large amounts of data are common to both the received and transmitted packets. Other, similar examples are found in some forms of reliable transmission where a packet may need to be retransmitted after some timeout period. In these situations it is common for only very small differences (if any) to exist between packets that have been passed to lower protocol layers or device drivers and those that will be used as the basis for any future retransmission.

A further application area in which the copy-on-write data sharing is applicable is that of packet routing to multiple addresses. In this application as with the reliable transmission example, only small changes are made to a packet as it passes through the routing system to several addresses. These changes may be to the first few bytes of header information and thus there is considerable scope for sharing netpages between a first netbuf and a second, or "clone," netbuf. For example, if a received packet needs to be sent to two devices, then two netbuts will be created for the packet, one for each address. If a netbuf needs to modify packet data in one of the shared netpages, the shared netpage is copied to a free netpage, and the pointer to the shared netpage is replaced with a pointer to the copied netpage in the corresponding netbuf list. The address header information in the copied netpage is then changed so that the packet can be routed to a given device. The selective. copying strategy utilized here serves a secondary purpose, that being to make the implementation faster than copying all of the packet data.

Therefore, "cloning" netbufs provide a mechanism to create a second netbuf that is initially identical to the original netbuf, and that shares identical netpages with the original netbuf (in this case, the netbuf reference count for each netpage is increased by one when the clone netbuf is generated). This netbuf cloning provides a major efficiency point, because the processing system can avoid copying all of the data for the entire packet that is stored in the netpages when only a portion of the packet data is modified.

Each netbuf has three logical buffer pointers associated with it, as shown in FIG. 4. These are the logical start pointer, logical end pointer, and access pointer (sometimes also referred to as the read/write pointer). The logical start pointer indicates the first logical address within the netbuf that contains data. The logical end pointer indicates the first logical address within the netbuf immediately after the last byte of data. The access pointer indicates the next position at which any read or write operations will take place. These pointers may be moved by the netbuf management software. For example, the pointers may be moved to adjust the size of the data contained within the buffer, or to locate specific data within the buffer.

The logical address space represented by the netbuf is twice the data storage capacity of the netpages that can be indexed by the netbuf. Therefore, the logical address space "wraps around" and for each element of data storage available within the netbuf, there are two logical addresses which represent it. At any one time, only one of these addresses may be in use, and the span from the logical start pointer to the logical end pointer may not be larger than the total storage capacity of the netpages indexed by the netbuf.

Therefore, the double-sized logical address space of a netbuf efficiently buffers packet data using a significantly smaller amount of memory than conventional buffers. For example, mapping of this logical space to the netpages indexed, or referenced, by a netbuf allows the microprocessor system to use a small amount of buffer memory, or netpages, to process the buffered data without needing additional buffer memory to copy the buffered data during the data processing.

For example, initially an empty netbuf (containing no data) will have all pointers referencing the middle of the logical address space. Subsequent data write operations may occur with either increasing or decreasing logical addresses allowing a buffer that is written with entirely decreasing or entirely increasing logical addresses or a combination of both the be accommodated within the available netpage data storage space that is indexed by the netbuf The processor has the ability to read and write data either immediately before or immediately after the access pointer. In particular, considerable efficiency is gained within the protocol handling software by writing data "backwards", before the access pointer. When data is written before the access pointer, the access pointer is moved to point to the start of the newly written data. When data is written after the access pointer, the pointer is moved to point to next logical address immediately following the newly written data. This bidirectional sequential read/write capability is an improvement over a conventional sequential access (as opposed to random access) mechanism that can only operate in one direction. This bidirectional sequential, or logical, access provides considerable benefit for many protocol operations such as reading data in ascending order but writing it in descending order. Therefore, netbufs provide a mechanism for protocol software to utilize bidirectional behavior.

For example, if the routing example described earlier is considered again, it is evident that the pattern of a small number of bytes before the initial access point with the bulk after it is in fact quite common within this application: When an IP datagram, transmitted via a link-layer protocol such as PPP, is to be routed to, say, an Ethernet network, then the smaller PPP link-layer header must be replaced with the Ethernet link-layer header. This will typically require a net insertion of perhaps ten bytes of data before the start of the original packet frame. By writing data starting in the middle of the logical address space it is easy to insert the additional ten header bytes in front of the original IP datagram without requiring the original data to be copied or moved, while the mapping of the logical address space to the netpages used for data storage ensures that no excess physical memory is required either.

As netbufs are designed to support hierarchical communication protocols (where each layer adds information to layers below it) "random" access is not generally supported. Instead, each netbuf maintains an access pointer that is used to identify the next location that will be accessed or modified. Each read or write function causes the pointer to be moved ready for the next use. While this "sequential" access might occasionally seem a little inconvenient it is actually much more efficient to implement than a random solution and leads to faster, smaller, software. Although an implementation of netbufs has been described with respect to software, netbufs may be implemented in hardware, software, or a combination of hardware and software.

Figure 5:
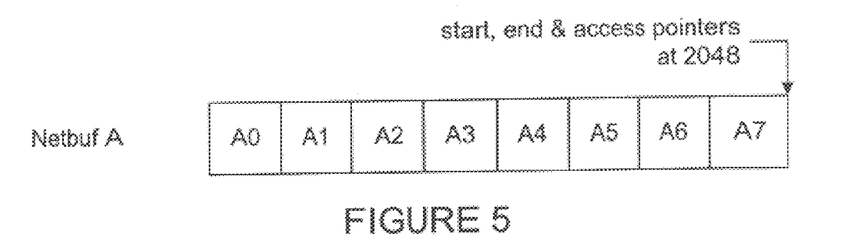
FIG. 5 shows an intial state of a netbuf according to one embodiment of the present invention.
Figure 6:
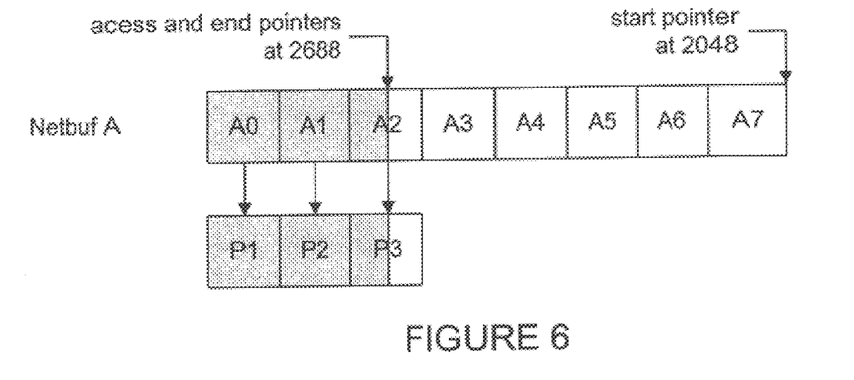
FIG. 6 shows a netbuf having logical addresses that map to physical memory addresses in netpages according to one embodiment of the present invention.
Figure 7:
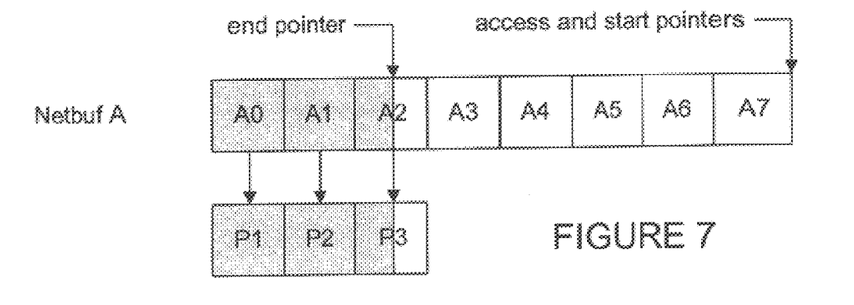
FIG. 7 shows an example of an access pointer moved to the same point as the logical start pointer.
Figure 8:
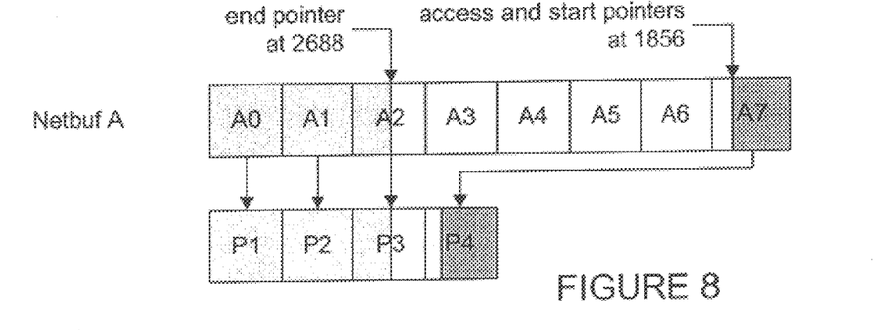
FIG. 8 shows an example of writing to a netbuf using logically decreasing addresses.

FIG. 5 shows an example of an initial state of netbuf A. The start, end, and access pointers are pointing to position 2048, which is the middle of the logical address space. As shown in FIG. 6, 640 bytes of data are written in a forward direction, where the logical address is increasing, into netbuf A. Three netpages, P1, P2, and P3, are allocated to hold the data. The end and access pointers are moved to the end of the newly written data, which is position 2688. FIG. 7 shows netbuf A and the corresponding netpages storing 640 bytes of data, but in this example, the access pointer is moved back to the same point as the logical start pointer. FIG. 8 shows an example of 192 bytes of protocol header information written backwards into netpage P4 via netbuf A. The access and start pointers are moved back to position 1856 which is now the start position of the newly written data.

Figure 9:
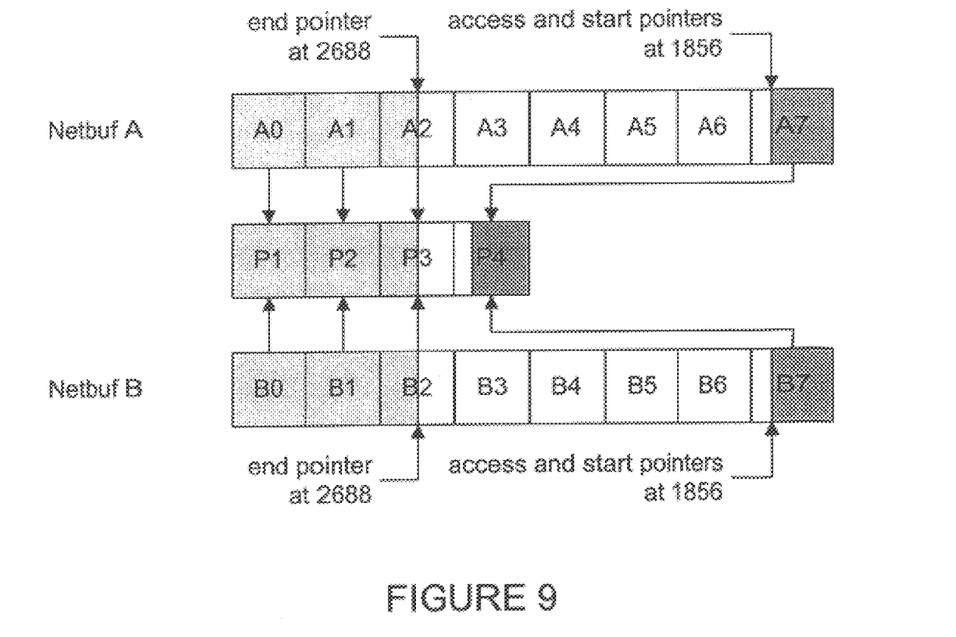
FIG. 9 shows an example of cloning a netbuf.

FIG. 9 shows a second netbuf, netbuf B, that is created by cloning netbuf A. The netpages used, or indexed, by netbuf A are now shared, or indexed, by netbuf B and the reference (or index) counts associated with each netpage are increased by one. This cloning operation may be used where a copy of the original contents of a netbuf is preserved for later use or where the two, initially identical netbufs may be subject to different protocol encapsulation.

Figure 10:
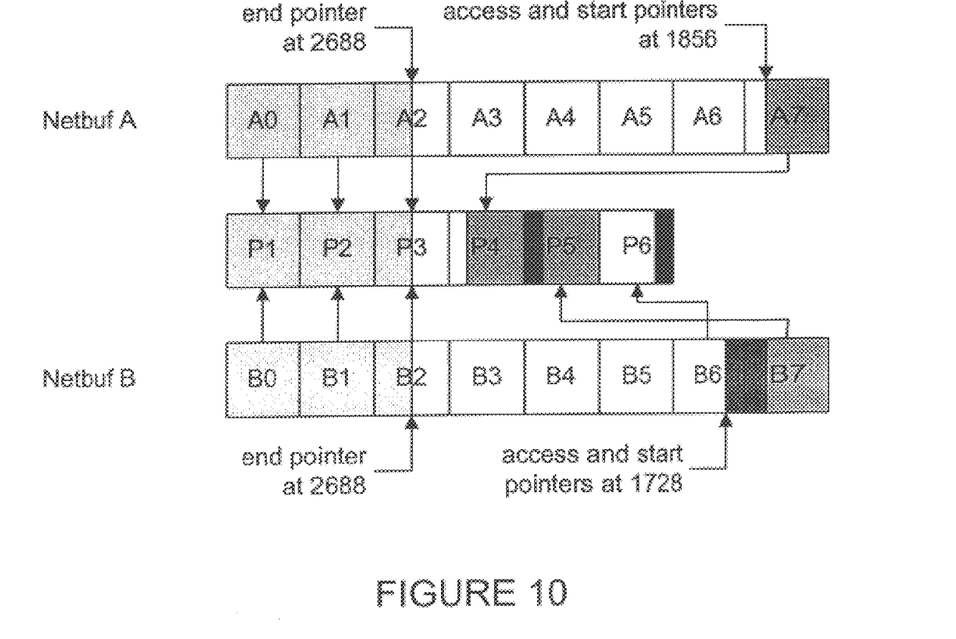
FIG. 10 shows an example of performing a copy-on-write operation to a netbuf.

FIG. 10 shows an example of modifying netbuf B to add a second layer of protocol headers. The attempted modification of the shared netpage P4 triggers the netbuf management software to perform a copy-on-write operation. P4 is copied into P5, the reference to it in B7 is amended to index the newly copied page and the count of netbufs referencing P4 is reduced by one. The new header is written backwards for netbuf B and the start and access pointers are updated accordingly. If all of the appropriate protocol headers have now been added to netbuf B, then this packet may be subsequently transmitted. During the transmission process, the contents of netbuf B will be sent as a logically contiguous block of data 960 bytes long, starting at logical address 1728 and ending with the last byte at address 2687.

Figure 11:
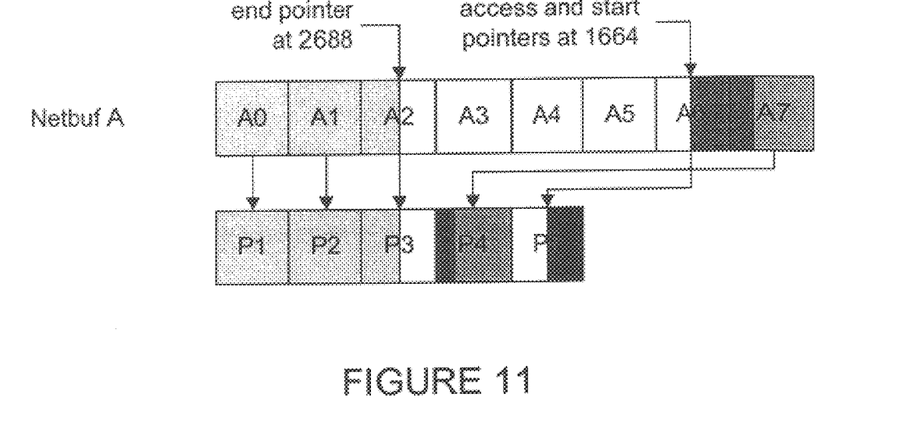
FIG. 11 shows an example of a netbuf after a cloned netbuf is released.

FIG. 11 shows an example of netbuf A after the data in netbuf B as shown in FIG. 10 has been transmitted, and the netpages associated with netbuf B have been released. The netpages that were shared with netbuf A remain indexed by netbuf A. A new header for netbuf A is written backwards from the current access pointer for netbuf A. As the page indexed by A6 is not shared, then the new protocol information can be written directly into netpage P4. When another netpage is required for the additional part of the header, netpage P5 is allocated, because this netpage has become free again when netbuf B released all of its netpages.

Figure 12:
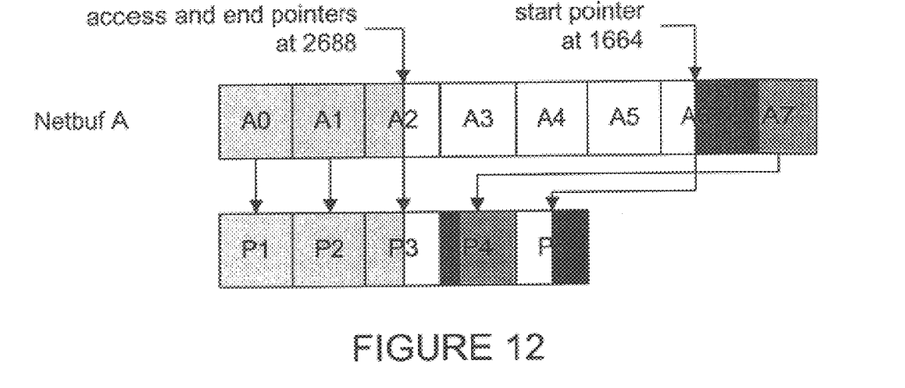
FIG. 12 shows an example of writing trailer data to a netbuf.
Figure 13:
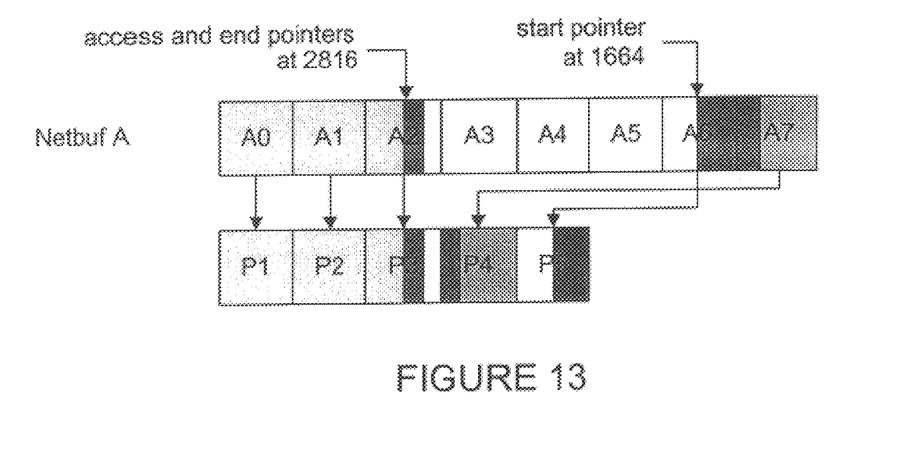
FIG. 13 shows a netbuf after trailer information has been added in logically increasing addresses.

FIG. 12 shows an example of netbuf A adding protocol trailer information at the end of the current packet data. The access pointer is moved to the end of the buffer. FIG. 13 shows that the protocol trailer information is written forwards, with increasing addresses, from the access pointer. The access and end pointers are adjusted to point immediately after the newly added information. Netbuf A may now be ready for transmission. If so, then the packet may be sent either via the same interface as netbuf B or through a second interface. This packet will be transmitted as a contiguous block of 1152 bytes starting from logical address 1664. After transmission is complete, then all of the netpages indexed by netbuf A may be released for use elsewhere.

Figure 14:
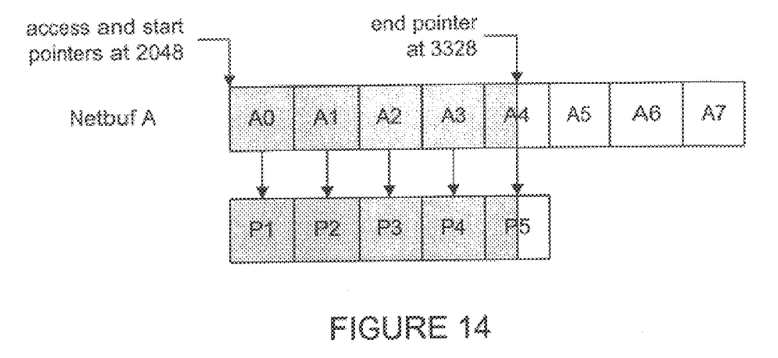
FIG. 14 shows an example of receiving a data packet into a netbuf.
Figure 15:
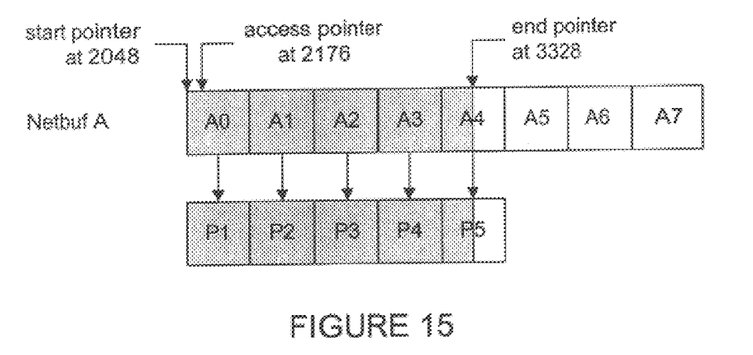
FIG. 15 shows an example of reading protocol header information from a netbuf using an access pointer.
Figure 16:
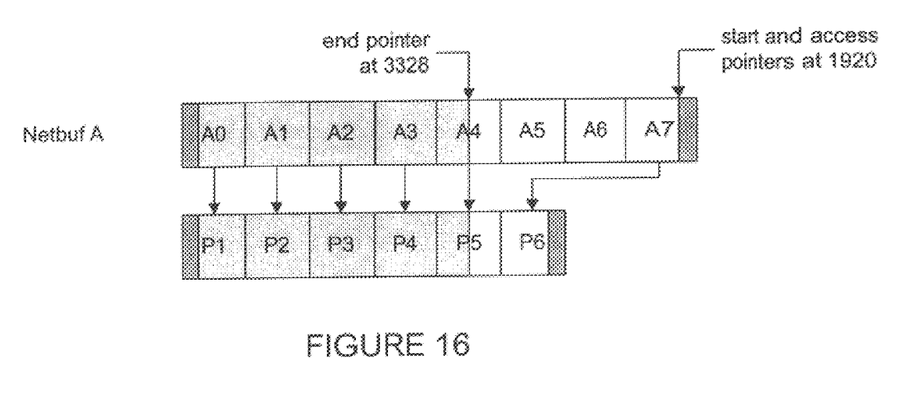
FIG. 16 shows replacing an original protocol header of a packet with a new protocol header using a netbuf.

FIG. 14 shows another example of using a netbuf to store and process packet data. A data packet is received by the microprocessor system, is stored in netpages P1 through P5, and is indexed to netbuf A. The access and start pointers of netbuf A are at the original start location of 2048, which is the center of the logical address space. The netbuf end pointer is at logical address 3328 and represents the location of the last data for the data packet. FIG. 15 shows an example of reading the packet's protocol header information from the start of the netbuf. In this example, the header information is located in logical addresses 2048 through 2176. The access pointer moves through the header until it reaches the end of the header information at logical, or sequential, address 2176. FIG. 16 shows that the protocol application software decides to replace the original protocol header data with new protocol headers for retransmission via a network (which may be a different network). After the new header information is added, the packet data stored in the buffer can be transmitted as a contiguous block of data by reading the data beginning from the logical start pointer at logical address 1920 to the logical end pointer at logical address 3328.

Figure 17:
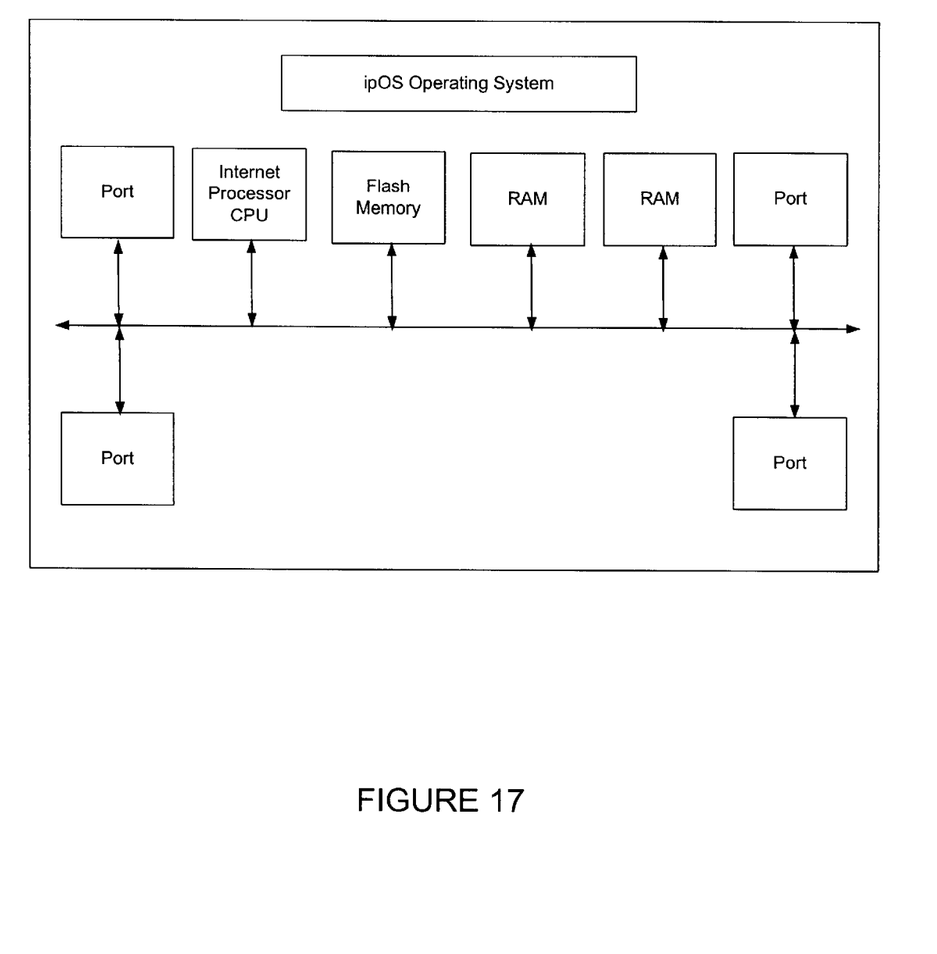
FIG. 17 shows another embodiment of a processor that uses netbufs.

FIG. 17 shows an example of a microprocessor based system, such as an internet processor or a system on a chip for example, that uses the netbufs discussed above. This processor can provide software system-on-chip performance by executing software modules and configuration tools, which may be stored in on-chip memory, to create a single integrated circuit device that can be used for a wide range of communications applications. This microprocessor-based system is suited for use in the node and bridge/gateway portions of a network infrastructure. The microprocessor-based system includes a microprocessor, complemented with on-chip high-speed flash, SRAM main memory, PRAM program memory and an optional off-chip external RAM.

The microprocessor based system, which may be a single adaptable integrated circuit platform, can be utilized to enable connectivity with numerous communications and device physical interfaces like 802.11 b, Bluetooth, HomePlug, Ethernet, MII, I$^2$C, SPI, GPSI, UART. For example, within the Internet infrastructure, device, or "node" applications are those that are commonly associated with the "embedded Internet" such as industrial controls, home appliances, medical devices, vending machines, and remote monitoring and control systems. These devices are frequently interconnected by local-area networks (LANs), such as Ethernet and wireless systems. Bridge/gateway devices such as the internet processor provide the functions that are required to connect the nodes, and their related LANs, to the Internet, such as protocol conversion, IP address routing, and firewall functions.

The microprocessor based system may use communication software, such as ipModule software for example, to support a wide range of networking and non-networking applications. Each ipModule is a package, or module, that contains collections of related functionalities. The modules are loaded into the program memory of the integrated circuit containing the microprocessor based system. Each module has multiple configuration points, which can be Boolean values, strings or expressions.

An ipOS module is a modular operating system that provides support services on which the other ipModule software and user application program can be built. One of the core features of the ipOS module is the implementation of the netbufs and their associated software interfaces.

Figure 18:
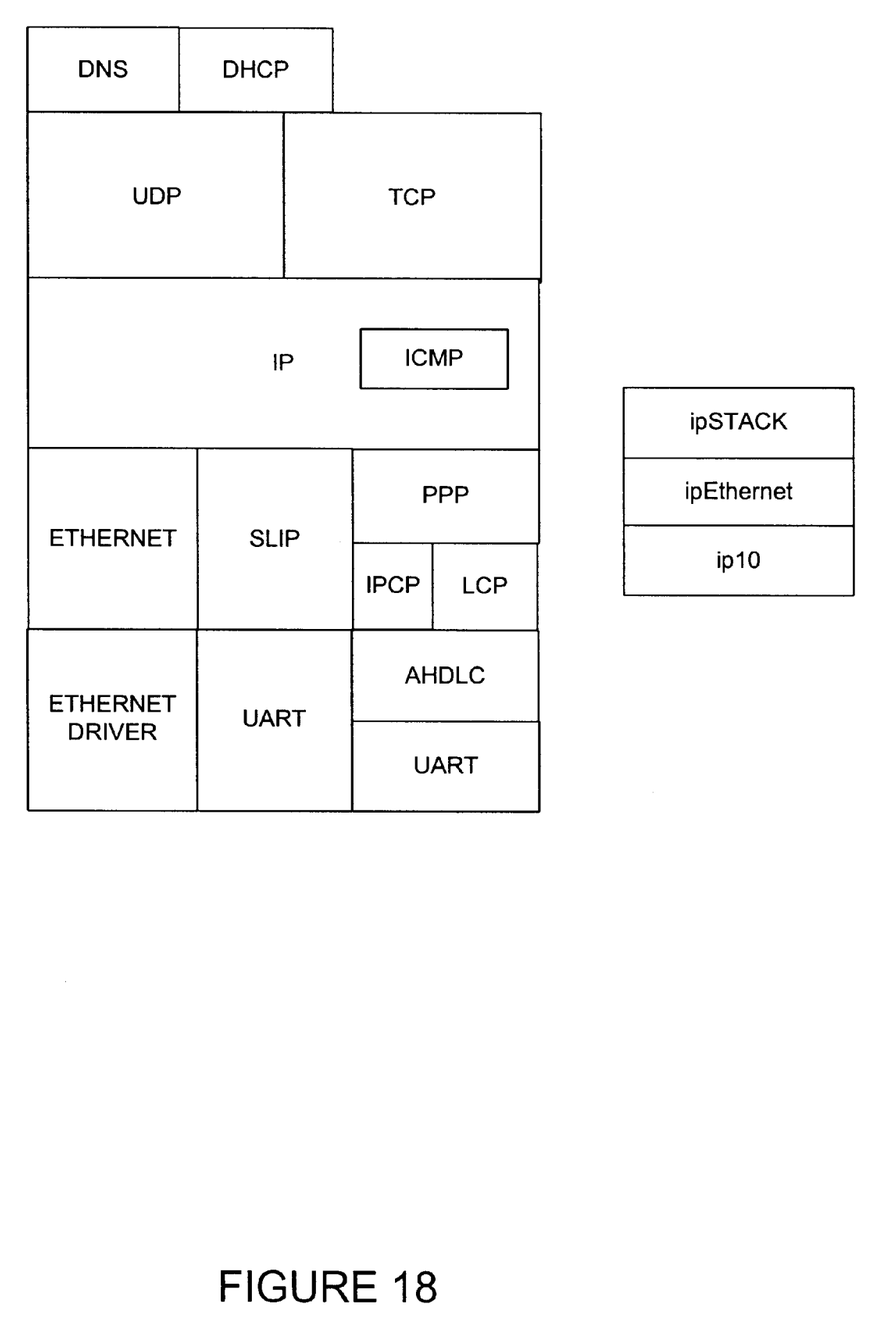
FIG. 18 shows a block diagram of some of the protocols that may be processed by the processor using netbufs.

As shown in FIG. 18, the ipStack module is an industry-standard TCP/IP (Transmission Control Protocol/Internet Protocol) network connectivity protocol stack that is designed to provide direct Internet access for cost- and size-constrained embedded applications, such as remote access and monitoring devices, industrial control systems and Web-enabled appliances. It enables system designers to produce embedded Internet devices without external physical access chips or a gateway PC. The ipStack software is built on top of the ipOS module, and is highly modular and configurable.

The network connectivity protocols currently supported within the ipStack module are: EP (Internet Protocol); ICMP (Internet Control Message Protocol); UDP (User Datagram Protocol); TCP (Transmission Control Protocol); DHCP (Dynamic Host Configuration Protocol); ARP (Address Resolution Protocol); SLIP (Serial Line Internet Protocol). All of these protocols utilize netbufs for their data handling.

The ipEthernet module is a complete software implementation of the 10 base-T (IEEE 802.3) Ethernet physical interface, including both the MAC and PHY functions. With it, an Ethernet networking capability can be designed into embedded applications using a single microprocessor based integrated circuit and a minimum of external circuitry (e.g., a transformer and a few resistors and capacitors). The ipEthernet software uses netbufs to manage the queuing of data to be transmitted and data that has been received. The ipEthernet software can be used with the ipStack module to create an Ethernet TCP/IP node.

Additional ipModule software, such as ipWeb, ipManage, ipPPP and ipDHCPServer implement more network protocols. These, too, use netbufs to manage protocol data buffers. Further ipModule software, such as ipUSB and ipBlue use the same netbuf implementation to provide communication protocols that are not related to TCP/IP networking. The use of netbufs enables a very large number of permutations of these software modules and optionally other software modules to be supported with very limited memory resources.

These and other embodiments of the present invention may be realized in accordance with the teachings described herein and it should be evident that various modifications and changes may be made in these teachings without departing from the broader spirit and scope of the invention. The specification, summary, abstract, and drawings are, accordingly, to be regarded in an illustrative rather than restrictive sense and the invention measured only in terms of the claims.

What is claimed is:

1. A microprocessor based system comprising:

a microprocessor; and a memory comprising instructions, which, when executed by the microprocessor, cause the microprocessor to store packet data in a physical address space of the memory; to generate a logical index of the physical address space, the logical index has a logical address space twice the size of the physical memory address space, the logical index to logically map the physical memory addresses, such that each physical memory address maps to two logical addresses; and to generate an access pointer to provide bidirectional logical access to the logical address space.

* * * * *